US007082935B2

(12) United States Patent
White

(10) Patent No.: US 7,082,935 B2
(45) Date of Patent: Aug. 1, 2006

(54) APPARATUS AND METHODS FOR CLOSED LOOP FUEL CONTROL

(75) Inventor: Vincent A. White, Northville, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/965,510

(22) Filed: Oct. 14, 2004

(65) Prior Publication Data

US 2006/0081231 A1 Apr. 20, 2006

(51) Int. Cl.
*F02D 41/00* (2006.01)
*B60T 7/12* (2006.01)

(52) U.S. Cl. ....................................... 123/674; 123/696

(58) Field of Classification Search ................ 123/305, 123/436, 674, 675, 682, 687, 688, 696, 703–704; 60/276, 285; 701/103–105, 109–110
See application file for complete search history.

(56) References Cited

U.S. PATENT DOCUMENTS

| | | | | | |
|---|---|---|---|---|---|
| 4,363,305 | A | * | 12/1982 | Ohgami et al. | 123/687 |
| 4,375,796 | A | * | 3/1983 | Ohgami et al. | 123/694 |
| 4,397,278 | A | * | 8/1983 | Hughes | 123/694 |
| 4,402,292 | A | * | 9/1983 | Ohgami et al. | 123/694 |
| 4,402,293 | A | * | 9/1983 | Ohgami | 123/675 |
| 4,503,828 | A | * | 3/1985 | Ohgami et al. | 123/694 |
| 4,628,884 | A | * | 12/1986 | Geering et al. | 123/684 |
| 5,131,372 | A | * | 7/1992 | Nakaniwa | 123/673 |
| 5,289,678 | A | * | 3/1994 | Grutter | 60/277 |
| 5,311,853 | A | * | 5/1994 | Takahashi et al. | 123/681 |
| 5,363,646 | A | * | 11/1994 | Orzel et al. | 60/274 |
| 5,394,856 | A | * | 3/1995 | Furuya | 123/681 |
| 5,462,039 | A | * | 10/1995 | Mamiya et al. | 123/686 |
| 5,566,663 | A | * | 10/1996 | Hamburg et al. | 123/679 |
| 5,970,968 | A | * | 10/1999 | Davis | 123/694 |
| 6,112,731 | A | * | 9/2000 | Linenberg et al. | 123/690 |
| 6,227,033 | B1 | * | 5/2001 | Kainz | 73/23.32 |
| 6,233,922 | B1 | * | 5/2001 | Maloney | 60/276 |
| 6,325,056 | B1 | * | 12/2001 | Weining et al. | 123/673 |
| 6,438,944 | B1 | * | 8/2002 | Bidner et al. | 60/274 |
| 6,463,735 | B1 | * | 10/2002 | Morinaga et al. | 60/277 |
| 6,470,868 | B1 | * | 10/2002 | Nakagawa et al. | 123/673 |
| 6,481,427 | B1 | * | 11/2002 | Javaherian | 123/673 |
| 6,567,738 | B1 | * | 5/2003 | Gopp et al. | 701/109 |
| 6,650,991 | B1 | * | 11/2003 | Farmer et al. | 701/104 |
| 6,684,868 | B1 | * | 2/2004 | Saga | 123/674 |
| 6,769,422 | B1 | * | 8/2004 | Ohkuma | 123/696 |
| 2004/0250534 | A1 | * | 12/2004 | Tanaka et al. | 60/284 |

FOREIGN PATENT DOCUMENTS

JP 6-229308 * 8/1994

* cited by examiner

*Primary Examiner*—Hai Huynh
(74) *Attorney, Agent, or Firm*—Christopher DeVries

(57) ABSTRACT

A method of controlling fuel input to an engine of a vehicle. A feedback signal is received from a sensor that senses engine exhaust. A dither signal having the same frequency as the feedback signal is applied to a fuel control signal controlling fuel to the engine. A proportional/integral correction is applied to the fuel control signal based on the frequency.

18 Claims, 2 Drawing Sheets

APPARATUS AND METHODS FOR CLOSED LOOP FUEL CONTROL

FIELD OF THE INVENTION

The present invention relates generally to vehicle fuel control systems and more particularly to closed loop control systems.

BACKGROUND OF THE INVENTION

In vehicle fuel control systems, closed-loop control is commonly implemented to control a ratio of air to fuel delivered to an engine. An exhaust oxygen sensor typically senses oxygen content in the engine exhaust. A vehicle control module may continuously adjust fuel to the engine based on the oxygen content information.

Closed-loop fuel control may be based on a switch-type oxygen sensor or, alternatively, on a more expensive proportional sensor that provides proportional equivalence ratio (ER) information. The switch-type sensor cycles essentially to a low or high state when a sensed air-fuel ratio goes above or below a narrow range about a stoichiometric set-point for the sensor. The switch-type sensor signal thus can indicate whether an exhaust stream is rich or lean of stoichiometry. Unlike the proportional sensor, however, the switch-type sensor cannot effectively detect ranges of air-fuel ratios. Because of this lack of proportional ER information, switch-type sensors generally are used in connection with integral-type closed-loop control algorithms.

SUMMARY OF THE INVENTION

The present invention, in one implementation, is directed to a method of controlling fuel input to an engine of a vehicle. A feedback signal is received from a sensor that senses engine exhaust. A dither signal having a frequency essentially equal to a frequency of the feedback signal is applied to a fuel control signal controlling fuel to the engine. A proportional/integral correction is applied to the fuel control signal based on the dither signal frequency.

In another configuration, a system for controlling fuel delivery to a vehicle engine includes a sensor that senses exhaust from the engine. A control module issues a fuel control signal controlling fuel to the engine based on a feedback signal from the sensor. The control module applies to the fuel control signal a dither signal that oscillates in response to the feedback signal and corrects the fuel control signal when an oscillation period of the dither signal exceeds a limit cycle of the dither signal.

In another implementation, the invention is directed to a method of controlling fuel input to an engine of a vehicle. A feedback signal is received from a sensor that senses engine exhaust. Based on the feedback signal, a dither signal is applied to a fuel control signal controlling fuel to the engine. A time error counter is changed when an oscillation period of the dither signal exceeds a limit cycle of the dither signal. The fuel control signal is corrected based on the changed counter.

In yet another configuration, a system for controlling fuel input to an engine of a vehicle includes a sensor that senses exhaust from the engine. A control module issues a fuel control signal controlling fuel to the engine based on a feedback signal from the sensor. The control module applies to the fuel control signal a dither signal that oscillates in response to the feedback signal and changes a time error counter based on an oscillation period of the dither signal.

The control module uses the changed counter to determine a proportional/integral correction and applies the correction to the fuel control signal.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

Figure 1:
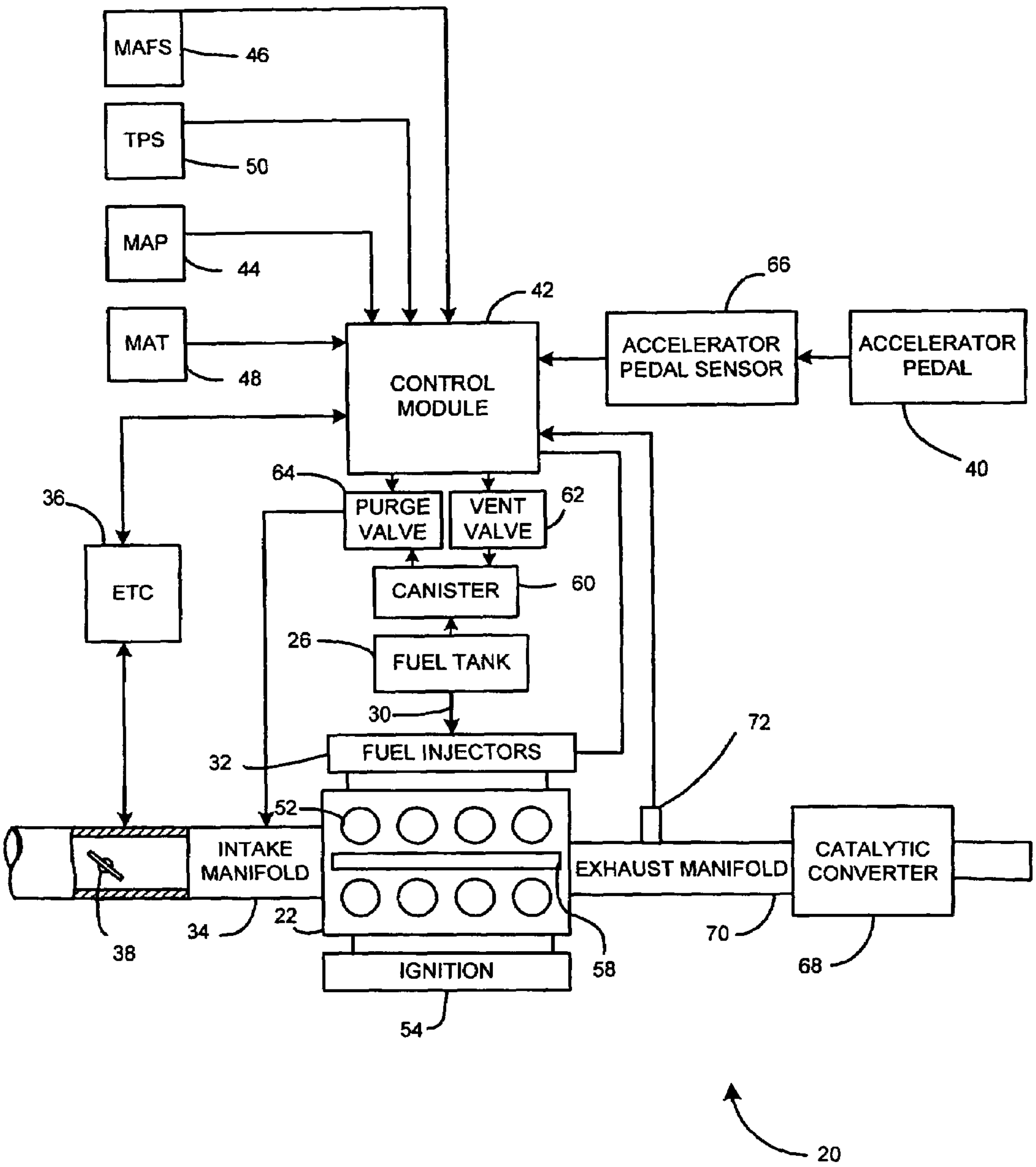
FIG. 1 is a functional block diagram of a system for controlling fuel delivery to a vehicle engine in accordance with one embodiment of the present invention.

The following description of various embodiments of the present invention is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality. Various configurations of the present invention are described herein with reference to a switch-type oxygen sensor. It should be noted, however, that the invention also can be practiced in connection with other types of sensors, including a sensor that provides proportional equivalence ratio information.

Referring now to FIG. 1, a vehicle including a closed-loop fuel control system in accordance with one embodiment of the present invention is indicated generally by reference number 20. Fuel is delivered to an engine 22 from a fuel tank 26 through a fuel line 30 and through a plurality of fuel injectors 32. Air is delivered to the engine 22 through an intake manifold 34. An electronic throttle controller (ETC) 36 adjusts a throttle plate 38 that is located adjacent to an inlet of the intake manifold 34 based upon a position of an accelerator pedal 40 and a throttle control algorithm that is executed by a control module 42. In controlling operation of the vehicle 20, the control module 42 may use a sensor signal 44 indicating pressure in the intake manifold 34. The control module 42 also may use a sensor signal 46 indicating mass air flow entering the intake manifold 34 past the throttle plate 38, a signal 48 indicating air temperature in the intake manifold 34, and a throttle position sensor signal 50 indicating an amount of opening of the throttle plate 38.

The engine 22 includes a plurality of cylinders 52 that receive fuel from the fuel injectors 32 to drive a crankshaft 58. Vapor from the fuel tank 26 is collected in a charcoal storage canister 60. The canister 60 may be vented to air through a vent valve 62. The canister 60 may be purged through a purge valve 64. When vapor is purged from the canister 60, it is delivered to the intake manifold 34 and burned in the engine cylinders 52. The control module 42 controls operation of the vent valve 62, purge valve 64, fuel injectors 32 and ignition system 54. The control module 42 also is connected with an accelerator pedal sensor 66 that senses a position of the accelerator pedal 40 and sends a signal representative of the pedal position to the control module 42.

A catalytic converter 68 receives exhaust from the engine 22 through an exhaust manifold 70. An exhaust sensor 72 senses exhaust in the manifold 70 and delivers a signal to the control module 42 indicative, for example, of whether the exhaust is lean or rich. As further described below, the signal output of the exhaust sensor 72 is used by the control module 42 as feedback in a closed-loop manner to regulate fuel delivery to the engine 22, e.g., via fuel injectors 32.

In one implementation of the present invention, the control module 42 receives the feedback signal from the exhaust sensor 72 and applies a dither signal, that is, a controlled perturbation signal, to a fuel control signal controlling fuel to the injectors 32. In one exemplary configuration, the fuel control signal has a control set point at or about stoichiometry. The dither signal can be formed by subtracting the dither amplitude from the fuel control signal when the exhaust sensor signal is above the control set point and adding the dither amplitude when the exhaust sensor signal is below the control set point. The dither signal has essentially the same frequency as the feedback signal. The control module 42 applies a proportional/integral correction to the fuel control signal based on the frequency.

The dither signal, when applied to the fuel control signal, forces an equivalence ratio (ER) of the engine exhaust to oscillate about a stoichiometric ER control set-point of the sensor 72. Such oscillations tend to be small enough not to affect performance of the engine 22. During steady-state time intervals, oscillation of the dither signal follows a limit cycle based on vehicle parameters such as engine speed, exhaust transport time and/or response time of the sensor 72. Thus the limit cycle is repeatable under steady-state conditions, e.g., when there are no transient errors signaled by the sensor 72.

The control module 42 increments or decrements a time error counter in accordance with an oscillation period of the dither signal. Based on the changed counter, the control module 42 applies a proportional/integral (P/I) correction signal to the fuel control signal. When, for example, a transient sensor error occurs, the oscillating frequency of the engine exhaust ER may slow. A value of the time error counter reflects such slowing. The control module 42 uses the counter value to apply a proportional correction. The control module 42 applies the correction to the fuel control signal, which in turn influences the engine ER.

The control module 42 also performs integral control relative to the fuel control signal. During steady-state conditions, a closed-loop integral correction rate is determined by the dither signal limit cycle. When a transient error occurs and is reflected by the time error counter, the rate of integral correction increases proportionately with the time error counter.

Figure 2:
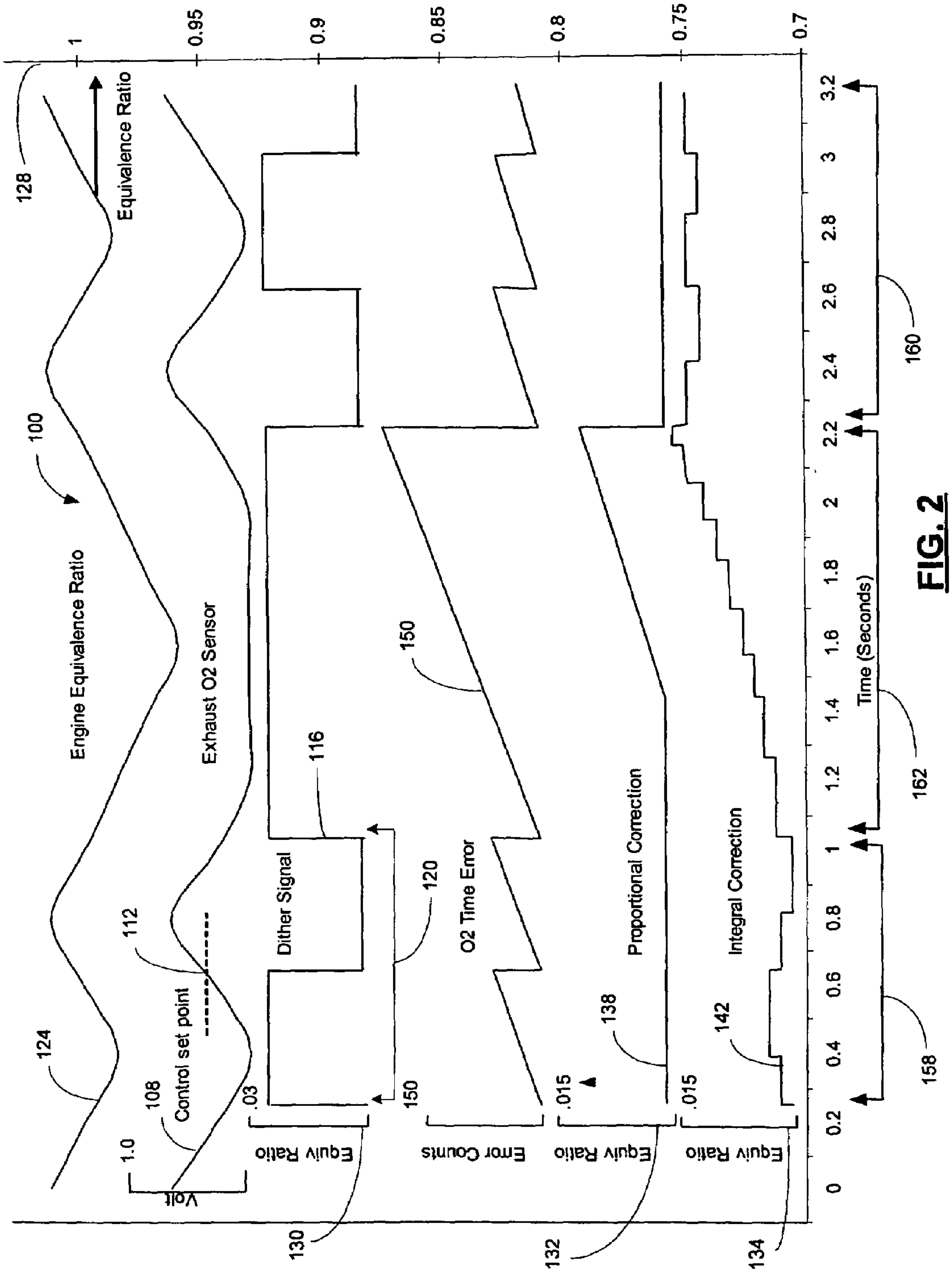
FIG. 2 is a timing diagram illustrating a method of closed-loop fuel control in accordance with one implementation of the present invention.

One configuration of the invention shall be described with reference to a timing diagram indicated generally in FIG. 2 by reference number 100. A line 108 represents a feedback signal from the exhaust sensor 72 to the control module 42. The sensor feedback signal 108 varies about a sensor control set point 112 whereby the sensor 72 indicates a stoichiometric equivalence ratio. The control module 42 issues a dither signal 116 that, during steady-state intervals, automatically attains a limit cycle 120 based on vehicle parameters such as engine speed, exhaust transport time and/or sensor response time. The dither signal 116 forces an engine exhaust equivalence ratio, represented by a line 124, to oscillate about the control set point 112 of the sensor 72. A right-hand axis 128 indicates the engine equivalence ratio 124 in terms of equivalence ratio units. Left-hand axes 130, 132 and 134 indicate the dither signal 116, a proportional correction 138 and an integral correction 142 in terms of equivalence ratio units.

The control module 42 maintains a time error counter, indicated by a line 150. When the dither signal 116 is brought high or low in response to set point crossings by the sensor signal 108, the counter 150 is zeroed and then incremented, until a subsequent rise or fall of the dither signal 116. Thus the error counter 150 tracks an oscillation cycle of the dither signal 116. The control module 42 uses the counter 150 to determine the proportional correction 138 as known in the art. The control module 42 also determines the integral correction 142 based on the counter 150. During steady-state intervals, e.g., during intervals 158 and 160, the integral correction 142 oscillates at the limit frequency of the dither signal 116. When the time error counter 150 indicates an error by the sensor 72, e.g., during an interval 162, the rate of integral correction increases proportionally with the counter 150.

Configurations of the foregoing fuel control system and related methods make it possible to incorporate proportional closed-loop fuel control along with improved integral control in emission control systems using a switch-type oxygen sensor. The limit frequency of the above described dither signal is precisely repeatable under steady conditions. Vehicle emission control thus can be improved by using the foregoing configurations, in connection with a sensor that is less costly than a proportional sensor.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of controlling fuel input to an engine of a vehicle, said method comprising:

receiving a feedback signal from a sensor that senses engine exhaust;

applying a dither signal that oscillates in response to the feedback signal to a fuel control signal controlling fuel to the engine; and applying a proportional/integral correction to the fuel control signal based on a frequency of said dither signal.

2. The method of claim 1, wherein during a steady-state interval said dither signal frequency comprises a limit frequency of the dither signal.

3. The method of claim 1, wherein said applying steps are performed to force an equivalence ratio of the engine exhaust to oscillate about a control set point of the sensor.

4. The method of claim 1, wherein applying a proportional/integral correction comprises:

establishing a rate of integral correction during a steady-state interval based on a limit cycle of the dither signal; and proportionately increasing the integral correction rate in response to a transient error of the sensor.

5. The method of claim 1, wherein applying a dither signal comprises timing a step of the dither signal to coincide with a crossing of the feedback signal across a control set point of the sensor.

6. The method of claim 1, wherein the dither signal achieves a limit cycle based on at least one of engine RPM, exhaust transport time and response time of the sensor.

7. The method of claim 1, wherein applying a proportional/integral correction comprises:

changing an error counter based on the dither signal frequency; and applying the proportional/integral correction based on the error counter.

8. A system for controlling fuel delivery to a vehicle engine, the system comprising:

a sensor that senses exhaust from the engine; and a control module that issues a fuel control signal controlling fuel to the engine based on a feedback signal from said sensor;

wherein said control module:

applies to the fuel control signal a dither signal that oscillates in response to the feedback signal; and corrects the fuel control signal when an oscillation period of the dither signal exceeds a limit cycle of the dither signal.

9. The system of claim 8, wherein said control module corrects the fuel control signal using proportional/integral correction.

10. The system of claim 8, wherein said control module:

changes an error counter based on said dither signal oscillation period; and applies a proportional/integral correction signal to the fuel control signal based on the changed error counter.

11. The system of claim 10, wherein a frequency of said proportional/integral correction signal increases while said error counter is changed by said control module.

12. The system of claim 8, wherein said sensor comprises one of the group consisting of a switch sensor and a proportional sensor.

13. The system of claim 8, wherein said dither signal achieves the limit cycle based on at least one of speed of the engine, exhaust transport time, and response time of said sensor.

14. A method of controlling fuel input to an engine of a vehicle, said method comprising:

receiving a feedback signal from a sensor that senses engine exhaust;

based on the feedback signal, applying a dither signal to a fuel control signal controlling fuel to the engine;

changing a time error counter when an oscillation period of the dither signal exceeds a limit cycle of the dither signal; and correcting the fuel control signal based on the changed counter.

15. The method of claim 14, wherein said correcting comprises applying at least one of a proportional correction and an integral correction.

16. The method of claim 14, further comprising:

establishing a rate of integral correction during a steady-state interval based on the limit cycle; and proportionately increasing the integral correction rate in response to a transient error of the sensor.

17. The method of claim 14, further comprising applying the dither signal at the same frequency as a frequency of the feedback signal.

18. A system for controlling fuel input to an engine of a vehicle, said system comprising:

a sensor that senses exhaust from the engine; and a control module that issues a fuel control signal controlling fuel to the engine based on a feedback signal from said sensor;

wherein said control module:

applies to the fuel control signal a dither signal that oscillates in response to the feedback signal;

changes a time error counter based on an oscillation period of the dither signal;

uses the changed counter to determine a proportional/integral correction; and applies the correction to the fuel control signal.

* * * * *